United States Patent [19]

Soukup et al.

[11] Patent Number: 4,710,521

[45] Date of Patent: Dec. 1, 1987

[54] CATALYST MIXTURES FOR POLYISOCYANURATE FOAM

[75] Inventors: Thomas G. Soukup, Clearwater; John P. Oliver, St. Petersburg, both of Fla.

[73] Assignee: The Celotex Corporation, Tampa, Fla.

[21] Appl. No.: 889,560

[22] Filed: Jul. 25, 1986

[51] Int. Cl.$^4$ .............................................. C08G 18/14
[52] U.S. Cl. .................................... 521/118; 427/373; 427/385.5; 428/304.4; 502/167; 502/170; 521/125; 521/129; 521/131; 521/164; 521/902
[58] Field of Search ............... 521/118, 125, 129, 131, 521/164, 902; 427/373, 385.5; 428/304.4; 502/167, 170

[56] References Cited

U.S. PATENT DOCUMENTS

| | | | |
|---|---|---|---|
| 4,169,921 | 10/1979 | Moss et al. | 521/125 |
| 4,292,353 | 9/1981 | Ohashi et al. | 428/211 |
| 4,292,361 | 9/1981 | Ohashi et al. | 428/215 |

FOREIGN PATENT DOCUMENTS 1184893 3/1970 United Kingdom .
1318925 5/1973 United Kingdom .

*Primary Examiner*—Maurice J. Welsh
*Attorney, Agent, or Firm*—James W. Grace; Charles W. Vanecek

[57] ABSTRACT

Rigid polyisocyanurate foams are prepared by (a) bringing together on a continuously advancing conveyor an organic polyisocyanate, a minor amount of a polyester polyol, a blowing agent and, in an organic solvent, a catalyst mixture comprising: (i) a salt of a low molecular weight carboxylic acid selected from the group consisting of an alkali metal salt and an alkaline earth metal salt and mixtures thereof, and (ii) a tertiary amine, the amount of the salt of the low molecular weight carboxylic acid being sufficient and the molecular weight of the carboxylic acid of the salt being sufficiently low to provide a firm foam having a non-friable surface, and (b) foaming the foam-forming mixture.

30 Claims, 3 Drawing Figures

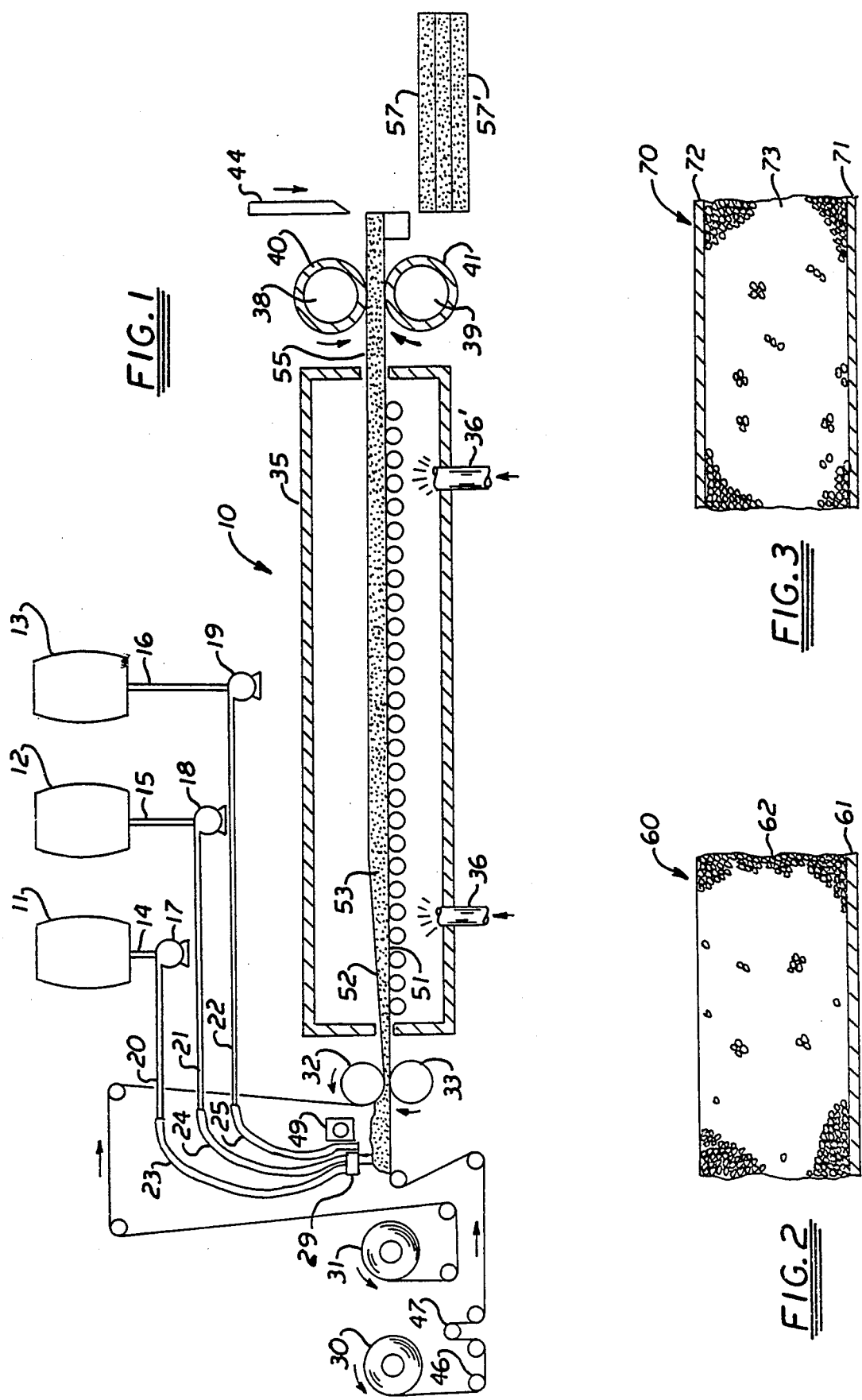

4,710,521

CATALYST MIXTURES FOR POLYISOCYANURATE FOAM

BACKGROUND OF THE INVENTION

1. Field of the Invention

The present invention relates to the preparation of polyisocyanurate foams and laminates. More particularly, the invention relates to the use of a co-catalyst system comprising metal-based and tertiary amine components in the preparation of polyisocyanurate foams from organic polyisocyanates and polyester polyols.

2. Description of the Prior Art

Polyisocyanurate foams are well known and are described, for example, in U.S. Pat. Nos. 3,799,896 and 3,940,517 and in U.K. Pat. No. 1,155,768. Such foams are conventionally made by reacting an organic polyisocyanate with a polyol in the presence of a blowing agent and a catalyst capable of polymerizing isocyanate groups to isocyanurate structures.

One standard, widely accepted, catalyst system used in industry in the preparation of polyol-modified polyisocyanurate foam comprises the combination of 2,4,6-tris-(N,N-dimethylaminomethyl)-phenol known as DMP-30 and potassium 2-ethyl-hexanoate, also known as potassium octoate (see, for example, U.S. Pat. No. 4,169,921). Although this catalyst mixture has proved to be highly useful in many cases, difficulties have been encountered in using it in the preparation of polyisocyanurate foams from polyisocyanates and polyester polyols of relatively high equivalent weight. The resultant foams have been found to be too soft for proper cutting, and the firm time/cream time ratio of the process has been higher than desired for efficient manufacture of the foams on a continuous line. It would be highly desirable if a catalyst system could be found for simply and efficiently manufacturing polyisocyanurate foams of high quality from polyisocyanates and polyester polyols.

OBJECTS OF THE INVENTION

It is therefore an object of the present invention to provide a catalyst system for the production from polyisocyanates and polyester polyols of polyisocyanurate foams having a combination of desirable properties, including a reduced friability, good dimensional stability, and high thermal stability and compressive strength.

It is another object of the present invention to provide polyisocyanurate foams from foam-forming materials which react rapidly to bring about a high conversion to trimer.

It is still another object of the present invention to provide an efficient, energy saving process requiring reduced production time and cure temperatures for continuously manufacturing a laminate of a polyisocyanurate foam having improved facing sheet adhesion and product flatness, while maintaining other advantageous physical properties of the laminate, such as superior fire resistant properties.

It is a further object of the present invention to produce an improved laminate having a facing sheet which adheres tenaciously to a polyisocyanurate foam core without altering other advantageous properties of the foam, such as a low friability and flammability.

It is a still further object of the present invention to provide closed cell polyisocyanurate foam materials which can be used in building panels which are highly insulating, thermally resistant, low in friability, soundproof and self-supporting.

These and other objects and advantages of the present invention will become more apparent by reference to the following detailed description and drawings wherein:

FIG. 1 is a side schematic representation of an apparatus suitable for producing a cellular foam material in accordance with the present invention;

FIG. 2 is a cross-sectional view of a laminated building panel having one facing sheet; and FIG. 3 is a cross-sectional view of a laminated building panel having two facing sheets.

DESCRIPTION OF THE INVENTION

The above objects have been achieved and the drawbacks of the prior art have been overcome by the use of a particular combination of catalysts for the formation of an improved polyisocyanurate foam from an organic polyisocyanate and a polyester polyol. The catalyst mixture of the invention contains at least one tertiary amine and at least one salt of a low molecular weight carboxylic acid. The improved foam is suitably produced in continuous length by depositing a foam-forming mixture, including the polyisocyanate, polyester polyol and catalyst mixture, on a continuously advancing conveyor means, such as on a moving facing sheet which becomes part of the finished product or structural laminate. Preferably, another moving facing sheet is supplied to cover the foam-forming mixture and yield a structural laminate having facing sheets on its upper and lower major surfaces.

Accordingly, the method of the invention for continuously producing the structural laminate comprises conveying a lower facing material along a production line; applying the foam-forming mixture to the lower facing material; optionally supplying an upper facing material over the applied foam-forming mixture; and foaming and thermally curing the foam-forming mixture. An advancing cover web having surfaces nonadherent to the foam may be used in place of the upper facing material, or in place of upper and lower facing materials in the case of unfaced foam.

The catalyst composition comprises the mixture of an anhydrous alkali metal and/or alkaline earth metal salt(s) of a low molecular weight carboxylic acid, such as one containing about 1 to 4 carbon atoms, and a tertiary amine(s). The cation of the metal-based catalyst component, which is preferably an alkali metal salt(s), advantageously is K or Na, more preferably K. Particularly preferred are $C_1$–$C_3$, more particularly $C_1$ and $C_2$, carboxylate salts, including the sodium and potassium salts of formic, acetic and propionic acids. The catalyst mixture is advantageously employed in the foam formation in the form of a solution in an organic solvent.

In the catalyzed production of the polyisocyanurate foams, the polyisocyanate is reacted with a minor amount of the polyol, such as sufficient polyol to provide about 0.10 to 0.95 hydroxyl equivalent of polyol per equivalent of the polyisocyanate. The improved process and resulting polyisocyanurate foam of the invention result from the employment of the catalyst mixture containing an effective amount of a salt(s) of a carboxylic acid of sufficiently low molecular weight to provide highly desirable foam reactivity and properties. It has been found that replacement of a high molecular weight carboxylate salt, such as the potassium octoate traditionally used, by the low molecular weight carboxylic acid salt(s) brings about a substantially improved reactivity profile and the production of a foam having properties, e.g., friability, thermal stability, dimensional stability, compressive strength and % conversion to trimer, which are significantly improved. For example, use of the catalyst advantageously results in a firm time/cream time ratio of less than about 5, more preferably 3; and the formation of a firm polyisocyanurate foam having a non-friable surface and a % conversion to trimer greater than about 60, more preferably 80, most preferably 85. The polyisocyanurate foam producible in accordance with the present invention has a firmness which makes it readily handleable in subsequent processing without any detrimental effect on its appearance or properties. For example, the foam can be easily cut without abrading its surface or damaging an adhering facer.

The tertiary amines which can be employed in the catalyst system in accordance with the invention are those which are more usually employed to catalyze the reaction between an isocyanato group and an active hydrogen atom. Such catalysts are a group of compounds well recognized in the art of synthesizing polyurethanes; see, for example, Saunders et al., Polyurethanes, Chemistry and Technology, Part I, pages 228–230, Interscience Publishers, New York, 1964; see also Burkus, J., Journal of Organic Chemistry, 26, pages 779–782, 1961.

Representative of said tertiary amine catalysts are: N,N-dialkylpiperazines such as N,N-dimethylpiperazine, N,N-diethylpiperazine and the like; trialkylamines such as trimethylamine, triethylamine, tributylamine and the like; 1,4-diazabicyclo[2.2.2]octane, which is more frequently referred to as triethylene diamine, and the lower-alkyl derivatives thereof such as 2-methyl triethylene diamine, 2,3-dimethyl triethylene diamine, 2,5-diethyl triethylene diamine and 2,6-diisopropyl triethylene diamine; N,N',N''-trialkylaminoalkyl-hexahydrotriazines such as N,N',N''-tris-(dimethylaminomethyl)-hexahydrotriazine, N,N',N''tris-(dimethylaminoethyl)hexahydrotriazine, N,N',N''tris-(diethylaminopropyl)hexahydrotriazine, N,N',N''tris-(diethylaminoethyl)hexahydrotriazine, N,N',N''tris-(diethylaminopropyl)hexahydrotriazine and the like; mono-, di-, and tri-(dialkylaminoalkyl) monohydric phenols or thiophenols such as 2-(dimethylaminomethyl)phenol, 2-(dimethylaminobutyl)phenol, 2-(diethylaminoethyl)phenol, 2-(diethylaminobutyl)phenol, 2-(dimethylaminomethyl)thiophenol, 2-(diethylaminoethyl)thiophenol, 2,4-bis(dimethylaminoethyl)phenol, 2,4-bis(-diethylaminobutyl)phenol, 2,4-bis(dipropylaminoethyl) phenol, 2,4-bis(dimethylaminoethyl)thiophenol, 2,4-bis(diethylaminopropyl)thiophenol, 2,4-bis (dipropylaminoethyl)thiophenol, 2,4,6-tris (dimethylaminoethyl) phenol, 2,4,6-tris(diethylaminoethyl)phenol, 2,4,6-tris(dimethylaminobutyl)phenol, 2,4,6-tris(dipropylaminomethyl) phenol, 2,4,6-tris(diethylaminoethyl) thiophenol, 2,4,6-tris (dimethylaminoethyl)thiophenol and the like; N,N,N',N'-tetraalkylalkylenediamines such as N,N,N',N'-tetramethyl-1,3-propane diamine, N,N,N',N'-tetramethyl-1,3-butanediamine, N,N,N',N'-tetramethylethylenediamine and the like; N,N-dialkylcyclohexylamines such as N,N-dimethylcyclohexylamine, N,N-diethylcyclohexylamine and the like; N-alkylmorpholines such as N-methylmorpholine, N-ethylmorpholine and the like; N,N-dialkylalkanolamines such as N,N-dimethylethanolamine, N,N-diethylethanolamine and the like; N,N,N'N'-tetraalkyl- guanidines such as N,N,N',N'-tetramethylguanidine, N,N,N',N'-tetraethylguanidine and the like. The tertiary amine catalysts can be employed singly or in combination of two or more such amines.

The preferred tertiary aminophenol of the catalyst mixture contains one or more tertiary amino groups and one or more phenolic hydroxyl groups. A tertiary amino group contained by the tertiary aminophenol may be any tertiary amino group; for example, it can be the group:

wherein $R_1$ and $R_2$ are alike or unlike, and are each an aliphatic, cycloaliphatic, aryl, heterocyclic, aliphaticcycloaliphatic, aliphatic-aryl, aliphatic-heterocyclic, cycloaliphatic-aliphatic, cycloaliphatic-aryl, cycloaliphatic-heterocyclic, aryl aliphatic, aryl cycloaliphatic, aryl heterocyclic, heterocyclic aliphatic, heterocycliccycloaliphatic or heterocyclic aryl group; or $R_1$ and $R_2$ are joined to form an alkylene chain that can be interrupted by a heterocyclic atom. Preferred tertiary amino groups are obtained when $R_1$ and $R_2$ are each an alkyl, cycloalkyl, phenyl, naphthyl, piperid-4-yl, alkyl cycloalkyl, alkyl phenyl, alkyl naphthyl, 1-alkyl-4-piperidyl, cycloalkyl alkyl, cycloalkyl phenyl, cycloalkyl naphthyl, 1-cycloalkyl-3-pyrrolidinyl, phenyl alkyl, naphthyl alkyl, phenyl cycloalkyl, 1-phenyl-4-piperidyl, pyrid-4-yl alkyl, pyrrolidin-3-yl cyclohexyl, morpholin-3-yl phenyl, morpholino, pyrrolidino or piperidino group. Particularly preferred tertiary amino groups are obtained when $R_1$ and $R_2$ are each an alkyl group containing 1 to 8 carbon atoms. If desired, the tertiary amino groups can be joined to the phenolic residue by an alkylene group, preferably an alkylene group containing 1 to 8 carbon atoms.

Some examples of tertiary aminophenols containing one or more tertiary amino groups and one or more phenolic hydroxyl groups are: 1-hydroxy-2-dialkylamino-4,5-dialkylbenzenes such as 1-hydroxy-2-diethylamino-4,5-dimethylbenzene; 1-hydroxy-2-dialkylamino naphthalenes such as 1-hydroxy-2-dimethylamino naphthalene; 1-hydroxy-2,4-bis(dialkylamino)benzenes such as 1-hydroxy-2,4-bis(diethylamino) benzene; 1-hydroxy-2-dialkylaminoalkyl benzenes such as 1-hydroxy-2-dimethylaminoethyl benzene: 1,2-dihydroxy-3-dialkylaminoalkyl benzenes such as 1,2-dihydroxy-3-dimethylaminomethyl benzene; and 1,2,3-trihydroxy-5-dialkylaminoalkyl benzenes such as 1,2,3-trihydroxy-5-dimethylaminomethyl benzene.

Preferred tertiary aminophenols have the general formula:

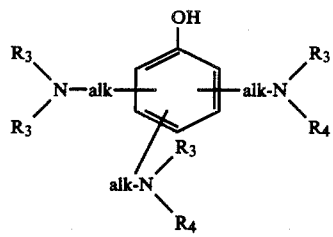

wherein alk is an alkylene group; and $R_3$ and $R_4$ are similar or dissimilar and are each an alkyl group. Particularly preferred tertiary aminophenols are 2,4,6-tris(-dialkylaminoalkyl)phenols, especially those wherein the alkyl groups have 1 to 8 carbon atoms; as, for example, 2,4,6-tris(dimethylaminomethyl)phenol, 2,4,6-tris-(diethylaminomethyl)phenol, and 2,4,6-tris(N-methyl-N-ethylaminoethyl)phenol.

Other preferred tertiary amine catalysts for use in preparing polyisocyanurate foams of the invention are the triethylene diamines and the N,N'N"-tris(dialkylaminoalkyl)hexahydrotriazines.

The mixture of the metal-based component and tertiary amine is suitably employed in the form of an anhydrous solution in a polar hydroxylic organic solvent. The solvent is preferably a polyol, which desirably is an alkylene diol or polyalkylene ether diol, e.g., diethylene glycol. It is generally desirable to dissolve the catalyst components in about the minimum solvent needed to dissolve the metal-based component, which is the more difficultly dissolvable component.

In an especially preferred embodiment of the present invention, the alkali metal and/or alkaline earth metal salts of low molecular weight carboxylic acids are employed in combination with alkali metal and/or alkaline earth metal salts of higher molecular weight carboxylic acids, such as those containing about 5 to 30, more preferably 8 to 30, carbon atoms. The combination of these mixed metal salts and the tertiary amine(s) results in a well-controlled foam reaction and a foam product having a combination of especially desirable properties. The advantages of this specific mixture of catalysts are particularly manifest in the continuous production of faced polyisocyanurate foam boards. Catalyzed by this mixture, the polyisocyanate and polyester polyol react smoothly and relatively rapidly in the foam formation to yield firm foam product which is highly adherent to the facing material and is characterized by particularly flat surfaces. The foam reactivity profile attainable through use of the catalyst mixtures of the invention is particularly suitable for high speed production of foam board product having excellent physical properties.

The equivalent ratio of metal-based catalyst component to tertiary amine component and of the low molecular weight carboxylate salts to the high molecular weight carboxylate salts for optimum practice of the invention can be readily determined through routine experimentation. The preferred ratios are those whose use gives rise to the desired reactivity and foam quality. A desirable foam reactivity profile is characterized by a cream time of from about 5 to 40, more preferably 10 to 30, and most preferably 15 to 25, sec.; and a firm time of from about 15 to 90, more preferably 20 to 70, and most preferably 25 to 55, sec.

The catalyst mixtures of the invention are used in a catalytically effective amount. Generally, the catalyst mixture comprises from about 0.1 to 20 and preferably from about 0.3 to 10 weight percent of the total foam-forming composition. In the catalyst mixtures, the equivalent ratio of the metal-based component to the tertiary amine component is generally from about 1.5:1 to 5:1, preferably 2:1 to 4:1 and more preferably 2.5:1 to 3.5:1. In the preferred embodiment of the invention involving the mixed metal-based catalyst components, the equivalent ratio of low molecular weight carboxylate salt: high molecular weight carboxylate salt is generally from about 0.5:1 to 5:1, preferably 1:1 to 2:1 and more preferably 1.25:1 to 1.5:1. In a particularly desirable embodiment of the invention involving the continuous production of foam board wherein the metal-based catalyst component does not include a higher molecular weight carboxylate salt, the equivalent ratio of the low molecular weight carboxylate salt to the tertiary amine suitably is at least about 3.25:1 and may range, for example, from about 3.25:1 to 4:1. Even higher proportions of low molecular weight carboxylate salts, especially of potassium salts, may be used in systems containing low NCO:OH equivalent ratios, such as below 1.4:1.

The polyisocyanurate foams of the present invention can be prepared by using standard techniques known to those skilled in the art. These foams can be simply prepared by polymerizing and foaming the organic polyisocyanate with the polyol in the presence of the catalyst mixture, blowing agent and other additives, such as a surfactant and the like, as necessary, at a suitable temperature, such as from about 0° C. to 150° C.

Suitable hydroxyl-terminated polyester polyols of the invention are prepared by condensation of a suitable polycarboxylic acid or derivative thereof with a suitable polyhydric alcohol. The polycarboxylic acid component may be an aliphatic compound, such as, for example, adipic acid, succinic acid, sebacic acid, dimer and trimer fatty acids, maleic acid or the like. It may be a suitable aromatic compound, such as, for example, phthalic anhydride; terephthalic acid, or the like. Any suitable polyhydric alcohol may be used in preparing the polyester, such as, for example, ethylene glycol, propylene glycol, trimethylol propane, diethylene glycol or other suitable polyalkylene glycols including polybutylene glycols or the like. The polycarboxylic acid may also be condensed with a suitable amino alcohol, such as, for example, monoethanolamine, diethanolamine, triethanolamine, or the like. Moreover, the polycarboxylic acid may be condensed with a mixture of polyhydric alcohols and amino alcohols. Particularly suitable are aromatic polyester polyols.

The polyols advantageously contain at least two hydroxyl groups and generally have an average equivalent weight of from about 75 to 500. Preferably, the polyesters contain from 1.8 to 8 hydroxyl groups and have an average equivalent weight of from about 100 to 300, more preferably from 120 to 250. Highly desirable aromatic polyester polyols of the invention have an average functionality of about 1.8 to 5, preferably about 2 to 2.5. The acid component of these polyesters advantageously comprises at least 40% by weight of phthalic acid residues. By phthalic acid residue is meant the group

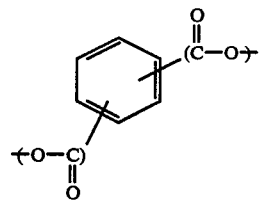

Particularly suitable compositions containing phthalic acid residues for use in the invention are (a) ester-containing by-products from the manufacture of dimethyl terephthalate and (b) polyalkylene terephthalates.

These polyesters include, for example, reaction products of polyhydric, preferably dihydric and optionally trihydric, alcohols with phthalic acids and other polybasic, preferably dibasic, carboxylic acids. Instead of using the free phthalic acids or polycarboxylic acids, the corresponding acid anhydrides or corresponding acid esters of lower alcohols or mixtures thereof may be used for preparing the polyesters. O-phthalic acids, isophthalic acids and/or terephthalic acids may be used as the phthalic acid. The optional polybasic-carboxylic acids may be aliphatic, cycloaliphatic, aromatic and/or heterocyclic and may be substituted, for example, with halogen atoms and/or may be unsaturated. The following are mentioned as examples: succinic acid, adipic acid, suberic acid, azelaic acid, sebacic acid, trimellitic acid, tetrahydrophthalic acid anhydride, hexahydrophthalic acid anhydride, endomethylene tetrahydro phthalic acid anhydride, glutaric acid anhydride, maleic acid, maleic acid anhydride, fumaric acid, dimeric and trimeric fatty acids, optionally mixed with monomeric fatty acids. Suitable polyhydric alcohols include, for example, ethylene glycol, propylene glycol-(1,2) and -(1,3), octane diol-(1,8), neopentyl glycol, cyclohexane dimethanol, (1,4-bis-hydroxymethylcyclohexane), 2-methyl-1,3-propane diol, glycerol, trimethylolpropane, hexanetriol-(1,2,6), butane triol-(1,2,4), trimethylolethane, pentaerythritol, quinitol, mannitol and sorbitol, methylglycoside, diethylene glycol, triethylene glycol, tetraethylene glycol, polyethylene glycols, dipropylene glycol, polypropylene glycols, dibutylene glycol, and polybutylene glycols.

A preferred hydroxy terminated aromatic polyester for use in the present invention is prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. This residue is described in U.S. Pat. No. 3,647,759, the disclosure of which is hereby incorporated by reference. Two preferred transesterifying glycols which can be reacted with the residue are ethylene glycol and diethylene glycol, with the latter being more preferred. Examples of transesterified residues which can be used in accordance with the invention are those supplied by Hercules, Inc., Wilmington, Del. under the trade name of Terate resins. An excess of the transesterifying glycol advantageously may be used to react with the residue defined above.

The properties of the above transesterified polyol mixtures which can be employed in accordance with the present invention fall within rather broad ranges. The polyol mixtures are described in U.S. Pat. No. 4,237,238, the disclosure of which is hereby incorporated by reference. A preferred polyol mixture is characterized by a viscosity in cps at 25° C. of about 1,600 to about 2,800, a free diethylene glycol content of from about 20 to about 30 percent by weight of said mixture, a hydroxyl number within a range of from about 400 to about 490, and an acid number of about 0.2 to about 8.

Another preferred aromatic polyester polyol which can be employed is prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. An expecially useful polyol mixture can be prepared by transesterifying a by-product fraction from the manufacture of dimethyl terephthalate comprising a mixture of:

(a) about 40 to 60 percent by weight of dimethyl terephthalate,
(b) about 1 to 10 percent by weight of monomethyl terephthalate,
(c) about 1 to 2 percent by weight of terephthalic acid,
(d) about 10 to 25 percent by weight of bi-ring esters,
(e) about 5 to 12 percent by weight of organic acid salts,
(f) about 18 to 25 percent by weight of polymeric materials, and
(g) about 1 to 4 percent by weight of ash.

An excess of the transesterifying glycol is advantageously used to react with the by-product fraction. Two preferred glycols for transesterifying the by-product fraction are ethylene glycol and diethylene glycol, with the latter being more preferred. An example of a transesterified by-product fraction of the invention is the product supplied by Jim Walter Resources, Inc. under the trade designation Foamol 250.

The properties of the polyol mixture produced by transesterifying the by-product fraction defined above are described in U.S. Pat. No. 4,411,949, the disclosure of which is hereby incorporated by reference. A preferred polyol mixture is characterized by a viscosity in cps at 25° C. of about 700 to about 2500, a free diethylene glycol content of from about 10 to about 30 percent by weight of said mixture, a hydroxyl number within a range of from about 350 to about 468, and an acid number of about 0.2 to about 10.

Other desirable aromatic polyester polyols for use in the present invention are prepared by the depolymerization or transesterification of polyalkylene terephthalate with a polyol, such as those described in U.S. application Ser. Nos. 372,904, filed Apr. 29, 1982, and 582,348 filed Feb. 22, 1984, now U.S. Pat. No. 4,539,341, the disclosures of which applications are hereby incorporated by reference. Still other especially useful aromatic polyester polyols are the aromatic Chardol polyols of Chardonol Corporation, and the aromatic Stepanpol polyols of Stepan Company.

Polyether polyols may be used in minor amounts in the foam formulations designed to produce the rigid foams of this invention. Minor amounts of these polyol additives may be defined as amounts which do not detract from the reactivity profile and physical properties of the foam and structural laminate.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1, 4-diisocyanate, cyclo-hexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4''-triphenylmethane-triisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylene polyphenyl polyisocyanates. These isocyanates are prepared by conventional methods known in the art such as the phosgenation of the corresponding organic amine.

In a preferred rigid foam of the invention, the organic polyisocyanate is polymethylene polyphenylisocyanate. The polymethylene polyphenylisocyanates desirably have a functionality of at least 2.1 and preferably 2.5 to 3.2. These preferred polymethylene polyphenylisocyanates generally have an equivalent weight between 120 and 180 and preferably have an equivalent weight between 130 and 145. The friability of foams made with these polyisocyanates is desirably less than 20%, preferably less than 15%.

A preferred subclass of polymethylene polyphenylisocyanates especially useful in the present invention is a mixture of those of the following formula:

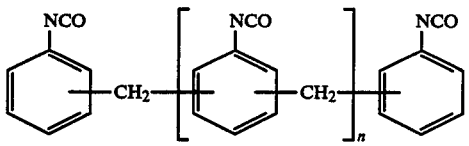

wherein n is an integer from 0 to 8 and wherein the mixture has the above-described functionality and equivalent weight. This mixture should have a viscosity (Brookfield) between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6–21. It should, therefore, be understood that the polymethylene polyphenylisocyanates available on the market under the tradenames of CODE 047 or PAPI-20 (Dow) and Mondur MR 200 (Mobay) can successfully be employed within the spirit and scope of the present invention.

In order to ensure complete reaction of the isocyanurate foams, the polyisocyanate, preferably polymethylene polyphenylisocyanate, and the polyol are generally mixed in an equivalent ratio of 1.5:1 to 6:1 and preferably 2:1 to 5:1. In ranges outside these proportions the reaction tends to yield a product having less desirable physical characteristics.

Any blowing agent typically employed in prior art foam products containing polyisocyanurate linkages can be employed in the foam compositions of the present invention. In general, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. Trichlorofluoromethane is a preferred blowing agent.

The foams also can be produced using the frothfoaming method disclosed in U.S. Pat. No. 4,572,865. In this method, the frothing agent can be any material which is inert to the reactive ingredients and is easily vaporized at atmospheric pressure. The frothing agent advantageously has an atmospheric boiling point of −50° to 10° C., and includes dichlorodifluoromethane, monochlorodifluoromethane, trifluoromethane, monochlorotrifluoromethane, monochloropentafluoroethane, vinylfluoride, vinylidene-fluoride, 1,1-difluoroethane, 1,1,1-trichlorodifluoroethane, and the like. Particularly preferred is dichlorodifluoromethane. A higher boiling blowing agent is desirably used in conjunction with the frothing agent. The blowing agent is a gaseous material at the reaction temperature and advantageously has an atmospheric boiling point ranging from about 10° to 80° C. Suitable blowing agents include trichloromonofluoromethane, 1,1,2-trichloro-1,2,2-trifluoroethane, acetone, pentane, and the like, preferably trichloromonofluoromethane.

The foaming agents, e.g., trichlorofluoromethane blowing agent or combined trichlorofluoromethane blowing agent and dichlorodifluoromethane frothing agent, are employed in an amount sufficient to give the resultant foam the desired bulk density which is generally between 0.5 and 10, and preferably between 1 and 5 pounds per cubic foot. The foaming agents generally comprise from 1 to 30, and preferably comprise from 5 to 20 weight percent of the composition. When a foaming agent has a boiling point at or below ambient, it is maintained under pressure until mixed with the other components. Alternatively, it can be maintained at subambient temperatures until mixed with the other components.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193[. Other suitable surfactants are those described in U.S. Pat. Nos. 4,365,024 and 4,529,745 and supplied by Jim Walter Resources, Inc. under the trademarks Foamstab 100 and 200. Generally, the surfactant comprises from about 0.05 to 10, and preferably from 0.1 to 6, weight percent of the foam-forming composition.

Other additives may also be included in the foam formulations. Included are flame retardants, such as tris(2-chloroethyl)-phosphate, dispersing agents, plasticizers, fillers and pigments.

Referring now to the drawings, and in particular to FIG. 1, there is shown schematically an apparatus 10 suitable for use in connection with the present invention. The apparatus 10 comprises an isocyanate tank 11, a polyol tank 12, and a catalyst tank 13, each respectively connected to outlet lines 14, 15, and 16. The lines 14, 15, and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower substrate material and a roll 31 of upper substrate material. The apparatus 10 is also provided with metering rolls 32 and 33, and an oven 35 provided with vents 36, 36' for blowing hot air. The apparatus 10 is also provided with pull rolls 38, 39 and cutting knife 44.

In operation, the isocyanate tank 11 is charged with the organic polyisocyanate admixed with the blowing agent and the surfactant, and the polyol tank 12 is charged with the polyol mixture of the invention, and the catalyst tank 13 is charged with the catalyst composition comprising the tertiary amine and metal salt(s) of a monocarboxylic acid. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25, whereupon they are mixed in the mixing head 29 and discharged therefrom. Alternatively, lines 21 and 22 can be combined prior to the mixing head. The pull rolls 38, 39, each of which has a flexible outer sheath 40, 41 are caused to rotate in the direction of the arrows by a power source (not shown). By virtue of rotation of the pull rolls 38, 39 lower substrate material is pulled from the roll 30, whereas upper substrate material is pulled from the roll 31. The substrate material passes over idler rollers such as idler rollers 46 and 47 and is directed to the nip between metering rolls 32, 33. The mixing head 29 is caused to move back and forth, i.e. out of the plane of the paper by virtue of its mounting on reversible mechanism 49. In this manner, an even amount of material can be maintained upstream of the nip between the metering rolls 32, 33. The composite structure at this point now comprising a lower substrate 51, an upper substrate 52 on either side of a core 53, now passes into the oven 35. While in the oven 35 the core expands under the influence of heat added by the hot air from vents 36, 36' and due to the heat generated in the exothermic reaction between the polyol mixture and the isocyanate in the presence of the catalyst. The temperature within the oven is controlled by varying the temperature of the hot air from vents 36, 36', in order to insure that the temperature within the oven 35 is maintained within appropriate limits. Curing of the foam in the oven can be carried out at temperatures of from about 125° F., or less, to about 350° F. or more, but is preferably carried out at a temperature of from about 125° F. to about 250° F. The time required for curing will depend upon the particular formulation involved and the curing temperature. The composite structure 55 then leaves the oven 35, passes between the nip of the pull rolls 38, 39 and is cut by knife 44 into individual panels 57, 57'.

Numerous modifications to the apparatus 10 will be immediately apparent to those skilled in the art. For example, the tanks 11, 12, and 13 can be provided with refrigeration means in order to maintain the reactants at subambient temperatures.

Referring to FIG. 2 of the drawings, there is shown a laminated building panel 60 of the invention. The building panel 60 comprises a single facing sheet 61 having thereon a cellular material 62 of the present invention. FIG. 3 shows a building panel 70 having two facing sheets 71 and 72 on either side of a cellular material 73.

Any facing sheet previously employed to produce building panels can be employed in the present invention. Both rigid and flexible facers may be used. For example, the carrier substrate or lower facer on the production line can be a rigid or flexible material, such as perlite board, kraft paper, gypsum board, fiberboard, a metal sheet such as steel or aluminum, asphalt-saturated felt, a fiber glass sheet, an asphalt fiber glass sheet, etc., while the covering or upper facer on the line is generally a flexible material, and may be an asphalt-saturated felt, an asphalt fiber glass sheet, a fiber glass sheet, a metal sheet (e.g., aluminum foil facer), kraft paper, etc.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

The invention is further illustrated by the following examples in which all parts and percentages are by weight unless otherwise indicated.

EXAMPLE 1

This example compares the catalytic effect of a potassium acetate/DMP-30 mixture and a potassium octoate/DMP-30 mixture in the synthesis of polyisocyanurate foams (14% trimer) from a polyisocyanate and aromatic polyester polyol.

In the foam syntheses, the following quantities of the following ingredients were combined as indicated:

| Item | Ingredient | Parts by Weight |
|---|---|---|
| A | Polymethylene polyphenyl isocyanate | 220 |
| B | $CFCl_3$ | 50 |
| C | Silicone surfactant | 2 |
| D | Aromatic polyester polyol | 80 |
| E | Catalyst (See Table I) | 9 |

In the foam syntheses, Item A is a polymethylene polyphenyl isocyanate having an equivalent weight of 138, an acidity of 0.03% HCl, and a viscosity of 2000 centipoises at 25° C. and is available from the Mobay Chemical Corporation, Pittsburgh, Pa. under the trade name MONDUR MR-200.

Item C is that supplied by the Union Carbide Corporation under the trade designation Y-10222.

Item D is that supplied by Jim Walter Resources, Inc. under the trade name Foamol 250.

A mixture of Items A, B, and C, at a temperature of 15° C., was poured into a reaction vessel. Item D was then added to the vessel, and all ingredients were mixed at 3600 rpm for 5 seconds. Item E described in Table I was then mixed into the contents of the vessel over a 5 second interval. All ingredients were thereafter mixed at 3600 rpm for an additional 7 seconds and then poured into a box, yielding a polyisocyanurate foam.

Characteristics of the foams produced are shown in the following Table I. The data of Table I demonstrate the higher exotherm and improved foam surface attainable through use of the KOAc/DMP-30 mixture instead of the KOct/DMP-30 mixture.

TABLE 1

| EFFECT OF CATALYST ON FOAM PROPERTIES | | |
|---|---|---|
| | FOAM PREPARED UTILIZING | |
| FOAM PROPERTIES | POTASSIUM ACETATE +DMP-30[1] | POTASSIUM OCTOATE +DMP-30[2] |
| Maximum Exotherm | 342° F. | 300° F. |

TABLE I-continued

EFFECT OF CATALYST ON FOAM PROPERTIES

| FOAM PROPERTIES | FOAM PREPARED UTILIZING | |
|---|---|---|
| | POTASSIUM ACETATE +DMP-30[1] | POTASSIUM OCTOATE +DMP-30[2] |
| Surface Friability | none | 1/8-3/16" deep |

[1]Catalyst mixture employed in the form of a solution in diethylene glycol (DEG) in a weight ratio of 2.36 potassium acetate:0.62 DMP-30:7.02 DEG.
[2]Catalyst mixture employed in the form of a solution in polyoxyethylene glycol (sold by the Union Carbide Corporation under the trade name Carbowax 200) in a weight ratio of 1.50 potassium octoate:2.14 DMP-30:8.00 polyoxyethylene glycol.

EXAMPLE 2

This example illustrates another comparison of the catalytic effect of a potassium acetate/DMP-30 mixture and a potassium octoate/DMP-30 mixture in the synthesis of polyisocyanurate foams (14% trimer) utilizing the polyisocyanate of Example 1 and a different aromatic polyester polyol. A Hennecke foam machine was employed in the preparation of each foam, and the following quantities of the following ingredients were combined as indicated.

| Item | Ingredient | Parts by Weight |
|---|---|---|
| A | Polymethylene polyphenyl isocyanate | 210 |
| B | CFCl₃ | 55 |
| C | Silicone surfactant | 2 |
| D | Aromatic polyester polyol | 90 |
| E | Catalyst (See Table II) | 9 |

Items A and C are those of Example 1.

Item D is that supplied by Stepan Company under the trade name Stepan 3152.

Items A, B, and C were premixed together, metered and injected into one side of the high pressure impingement mixing chamber of the machine. Metered amounts of items D and E were injected into the other side of the high pressure impingement mixing chamber. After mixing, all ingredients were dispensed into a box, yielding a polyisocyanurate foam.

The firm time/cream time ratio of each foam is reported in Table II. Various additional characteristics of the foams produced are also shown in the following Table II.

The Table II results show that the polyisocyanurate foam made with the KOAc/DMP-30 mixture was of better quality than the foam made with the KOct/DMP-30 mixture. The former foam also had a lower firm time/cream time ratio and hence a more desirable processability.

TABLE II

EFFECT OF CATALYST ON FOAM PROPERTIES

| FOAM PROPERTIES | FOAM PREPARED UTILIZING | |
|---|---|---|
| | POTASSIUM ACETATE +DMP-30[1] | POTASSIUM OCTOATE +DMP-30[2] |
| Firm Time/Cream Time Ratio | 2.00 | 2.19 |
| Dimensional Stability[3] 7 days (% change) | | |
| 70° C./95% R.H. | 1.7 | 2.1 |
| 125° C. | 1.9 | 2.6 |
| Compressive Strength[4] (p.s.i.) | 31.2 | 27.6 |
| Oxygen Index[5] (% O₂) | 25.5 | 24.3 |
| E-84 Flame Spread[6] | 28.0 | 38.0 |

[1]Catalyst mixture employed in the form of a solution in diethylene glycol (DEG) in a weight ratio of 2.36 potassium acetate:0.62 DMP-30:7.02 DEG.
[2]Catalyst mixture employed in the form of a solution in DEG in a weight ratio of 4.38 potassium octoate:0.62 DMP-30:5.00 DEG.
[3]According to ASTM Test Method D-2126.
[4]According to ASTM Test Method F-1621-73.
[5]According to ASTM Test Method D-2863.
[6]According to ASTM Test Method E-84.

EXAMPLE 3

The catalyst evaluation procedure of Example 2 was repeated, except that a different aromatic polyester polyol was employed in the production of the two polyisocyanurate foams (14% trimer).

The following ingredients were combined as indicated in Example 2.

| Item | Ingredient | Parts by Weight |
|---|---|---|
| A | Polymethylene polyphenyl isocyanate | 210 |
| B | CFCl₃ | 55 |
| C | Silicone surfactant | 2 |
| D | Aromatic polyester polyol | 90 |
| E | Catalyst (See Table III) | 9 |

Items A and C are those of Example 2.

Item D is that supplied by Jim Walter Resources, Inc. under the trade name Foamol 351.

Properties of the resultant foams are shown in the following Table III. It can be seen that the polyisocyanurate foam made with the KOAc/DMP-30 mixture was superior in processability and fire resistance to the one made with the KOct/DMP-30 mixture.

TABLE III

EFFECT OF CATALYST ON FOAM PROPERTIES

| FOAM PROPERTIES | FOAM PREPARED UTILIZING | |
|---|---|---|
| | POTASSIUM ACETATE +DMP-30[2] | POTASSIUM OCTOATE +DMP-30[3] Firm |
| Time/Cream Time Ratio | 1.95 | 2.35 |
| Foam Quality | firm | soft |
| E-84 Flame Spread[1] | 22.8 | 35.1 |

[1]According to ASTM Test Method E-84.
[2]Catalyst mixture employed in the form of a solution in diethylene glycol (DEG) in a weight ratio of 2.36 potassium acetate:0.62 DMP-30:7.02 DEG.
[3]Catalyst mixture employed in the form of a solution in DEG in a weight ratio of 3.23 potassium octoate:0.77 DMP-30:6.00 DEG.

EXAMPLE 4

This example illustrates the use of the catalyst mixtures of Example 3 in the production of faced polyisocyanurate foams on a commercial scale by reference to FIG. 1 of the drawings.

A. PRODUCTION OF LAMINATED STRUCTURAL PANEL

The following quantities of the following ingredients were combined as indicated below:

| Item | Ingredient | Parts by Weight |
|------|------------|-----------------|
| A | Polymethylene polyphenyl isocyanate* | (See Table IV) |
| B | $CFCl_3$ | 50 |
| C | Silicone surfactant* | 2 |
| D | Aromatic polyester polyol (See Table IV) | |
| E | Catalyst (See Table IV) | 9 |

*Of Example 2.

Items A, B, and C were mixed with each other and placed in the tank 11. Item D was placed in the tank 12. Item E was placed in the tank 13. Table IV below shows for the production of each of laminates A to D the top and bottom facers utilized. The oven 35 was heated to a temperature of 150°-200° F. The rolls 38, 39 were started, as well as the pumps 17, 18, and 19 to discharge the contents of the tanks 11, 12, 13 into the respective feed lines which carry the ingredients to the mixing head 29. The mixing head 29 deposited the foam forming mixture onto the lower substrate and both upper and lower substrates and foamable mixture were then conveyed into the oven 35 to produce a laminated structural panel 55 of the present invention.

The % conversion to trimer of the resulting faced polyisocyanurate foams is reported in Table IV below:

B. DETERMINATION OF % CONVERSION TO TRIMER IN ISOCYANURATE FOAMS

Each of the foams of this example was tested to determine its residual isocyanate in accordance with the following procedure:

PROCEDURE:
1. 0.2–0.5 gram of foam (in duplicate), grated with a #16 mesh Nichrome wire screen, was weighed into a 125 ml Erlenmeyer flask.
2. 5 ml of dry di-n-butylamine solution$^a$ was pipetted into the flask, wetting the entire sample but not the sides of the flask.
3. 5 ml of dry DMF (N,N—dimethylformamide) was pipetted into the flask. Any amine solution on the side of the flask was carefully washed down and the flask was stoppered with a cork immediately.
4. Steps 2 and 3 were repeated for a reagent blank.
5. The flasks were allowed to stand 30 minutes; then 50 ml of water was added from a graduated cylinder.
6. 5 drops of methyl red indicator were added and the excess amine was titrated with a standardized 0.1N HCl solution to the pink end point (yellow to pink).

CALCULATIONS:

% NCO =

$$\frac{(\text{ml blank} - \text{ml sample})(\text{normality HCl})(4.2)^b}{\text{wt sample (gm)}} - 0.33^b$$

where:
- % NCO = percent isocyanate content in the foam
- ml blank = the volume of HCl added to the blank
- ml sample = the volume of HCl added to the sample
- a. Di-n-butylamine solution made by pipetting 5 ml into a 100 ml volumetric flask and diluting to volume with dry DMF.
- b. The factor 0.33 is the sample blank that has been treated with methanol, water and high temperature to minimize the residual isocyanate content. The 4.2 factor converts m-moles of NCO to grams NCO and includes the factor of 100 for converting weight ratio to percent.

The % residual isocyanate determined for each foam was subtracted from the % isocyanate available for trimerization in the foam-forming composition, and the result is reported in Table IV below as % conversion to trimer.

The Table IV results show that the foams of structural laminates A and C made with the potassium acetate/DMP-30 catalyst are characterized by a % conversion to trimer which is significantly higher than that of the foams made with the potassium octoate/DMP-30 catalyst.

TABLE IV

% CONVERSION TO TRIMER OF FACED FOAMS

| STRUCTURAL LAMINATE | ISOCYANATE (pts. by wt.) | POLYESTER POLYOL (pts. by wt.) | CATALYST | CONVERSION TO TRIMER % |
|---|---|---|---|---|
| A[1] | 210 | 90[3] | KOAc/DMP-30[5] | 88.3 |
| B[1] | 220 | 80[4] | KOct/DMP-30[6] | 62.7 |
| C[2] | 232 | 68[3] | KOAc/DMP-30[5] | 83.8 |
| D[2] | 240 | 60[4] | KOct/DMP-30[6] | 67.7 |

[1]Top facer is aluminum foil/aluminum foil, kraft paper/aluminum foil trilaminate; bottom facer is aluminum foil.
[2]Top and bottom facers are aluminum foil.
[3]Polyester polyol is that supplied by Stepan Company under the trade name Stepan 3152.
[4]Polyester polyol is that supplied by Chardonol Corporation under the trade name Chardol 560.
[5]Catalyst mixture employed in the form of a solution in diethylene glycol (DEG) in a weight ratio of 2.36 potassium acetate:0.62 DMP-30:7.02 DEG.
[6]Catalyst mixture employed in the form of a solution in DEG in a weight ratio of 3.23 potassium octoate:0.77 DMP-30:6.00 DEG.

EXAMPLE 5

This example illustrates the production on a commercial scale of a faced polyisocyanurate foam from a polyisocyanate and aromatic polyester polyol, utilizing as catalyst a mixture of potassium acetate, potassium octoate and DMP-30.

In the synthesis of the structural laminate, the following quantities of the following ingredients were combined as indicated:

| Item | Ingredient | Parts by Weight |
|------|------------|-----------------|
| A | Polymethylene polyphenyl isocyanate* | 190 |
| B | $CFCl_3$ | 50 |
| C | Silicone surfactant* | 2 |
| D | Aromatic polyester polyol* | 110 |
| E | Catalyst[1] | 9 |

*Of Example 2.
[1]Catalyst mixture employed in the form of a solution in diethylene glycol (DEG) in a weight ratio of 1.18 potassium acetate:1.62 potassium octoate:0.69 DMP-30:6.51 DEG.

The structural laminate was produced according to the procedure of Example 4 for laminate A. Characteristics of the product are shown in Table V below.

TABLE V

| PROPERTIES OF POLYISOCYANURATE FOAM | |
|---|---|
| FOAM PROPERTY | VALUE |
| Density, core, pcf | 1.7 |
| Closed Cell Content[1], % | 90.5 |
| Friability[2], % wt. loss | 4.4 |
| Oxygen Index[3], % $O_2$ | 23.5 |
| K-Factor, initial, Btu-in/hr-ft[2]-°F. | 0.115 |
| E-84 Flame Spread[4] | 23 |
| Dimensional Stability[5] 28 days, % volume change | |
| 70° C./95% RH | 1.9 |
| 125° C. | 1.0 |
| −40° C. | −0.1 |

[1]According to ASTM Test Method D-2856-70.
[2]According to ASTM Test Method C-421.
[3]According to ASTM Test Method D-2863.
[4]According to ASTM Test Method E-84.
[5]According to ASTM Test Method D-2126.

We claim:

1. A continuous process for producing a rigid polyisocyanurate foam which comprises:
   (a) bringing together on a continuouly advancing conveyor an organic polyisocyanate, a minor amount of a polyester polyol, a blowing agent and, in an organic solvent, a catalyst mixture comprising (i) a salt of a low molecular weight carboxylic acid selected from the group consisting of an alkali metal salt and an alkaline earth metal salt and mixtures thereof, (ii) a salt of a higher molecular weight carboxylic acid selected from the group consisting of an alkali metal salt and an alkaline earth metal salt and mixtures thereof, the higher molecular weight carboxylic acid having from about 5 to 30 carbon atoms, and (iii) a tertiary amine, and
   (b) forming the foam-forming mixture.

2. The process of claim 1 wherein the catalyst mixture comprises at least one alkali metal salt of the low molecular weight carboxylic acid, at least one alkali metal salt of the higher molecular weight carboxylic acid, and at least one tertiary amine in a polyol selected from the group consisting of an alkylene diol, a polyalkylene ether diol and mixtures thereof.

3. The process of claim 2 wherein the equivalent ratio of low molecular weight carboxlate salt: higher molecular weight carboxylate salt is from about 0.5:1 to 5:1, and the equivalent ratio of carboxylate salts:tertiary amine is from about 1.5:1 to 5:1.

4. The process of claim 2 wherein the higher molecular weight carboxylic acid has from about 8 to 30 carbon atoms.

5. The process of claim 2 wherein the alkali metal salt of the low molecular weight carboxylic acid is potassium acetate, the alkali metal salt of the higher molecular weight carboxylic acid is potassium octoate, and the tertiary amine is 2,4,6-tris(dimethylaminomethyl) phenol.

6. The process of claim 5 wherein the equivalent ratio of potassium acetate:potassium octoate is from about 1.25:1 to 1.5:1, and the equivalent ratio of carboxylate salts:2,4,6-tris-(dimethylaminomethyl) phenol is from about 2.5:1 to 3.5:1.

7. The process of claim 2 wherein the organic polyisocyanate is a polymethylene polyphenylisocyanate, the polyester polyol is an aromatic polyester polyol having an average equivalent weight of from about 75 to 500, and the blowing agent is a halohydrocarbon.

8. The process of claim 7 wherein the equivalent ratio of low molecular weight carboxylate salt: higher molecular weight carboxy late salt is from about 0.5:1 to 5:1, and the equivalent ratio of carboxylate salts:tertiary amine is from about 1.5:1 to 5:1.

9. The process of claim 7 wherein the higher molecular weight carboxylic acid has from about 8 to 30 carbon atoms.

10. The process of claim 9 wherein the foam is cured at a temperature from about 125° F. to 250° F.

11. The process of claim 9 wherein the atomatic polyester polyol has an average equivalent weight of from about 120 to 250 and an average functionality of about 2 to 2.5.

12. The process of claim 9 wherein the alkali metal salt of the low molecular weight caboxylic acid is potassium acetate, the alkali metal salt of the higher moleculoar weight carboxylic acid is potassium octoate, and the tertiary amine is 2,4,6-tris(dimethylaminomethyl) phenol.

13. The process of claim 12 wherein the equivalent ratio of potassium acetate:potassium octoate is from about 1.25:1 to 1.5:1, and the equivalent ratio of carboxylate salts:2,4,6-tris-(dimethylaminomethyl) phenol is from about 2.5:1 to 3.5:1.

14. The process of claim 13 wherein the aromatic polyester polyol has an aerage equivalent weight of from about 120 to 250 and an average functionality of about 2 to 2.5.

15. A rigid polyisocyanurate foam comprising the reaction product of an organic poly isocyanate, a minor amount of a polyester polyol, a blowing agent, and, in an organic solvent, a catalyst mixture comprising:
   (a) a salt of a low molecular weight carboxylic acid selected from the group consisting of an alkali metal salt and an alkaline earth metal salt and mixtures thereof,
   (b) a salt of a higher molecular weight carboxylic acid selected from the group consisting of an alkali metal salt and an alkaline earth metal salt and mixture thereof, the higher molecular weight carboxylic acid having from about 5 to 30 carbon atoms, and
   (c) a tertiary amine.

16. The polyisocyanurate foam of claim 15 wherein the catalyst mixture comprises at least one alkali metal salt of the low molecular weight carboxylic acid, at least one alkali metal salt of the higher molecular weight carboxylic acid, the higher molecular weight carboxylic acid having from about 8 to 30 carbon atoms, and at least one tertiary amine in a polyol selected from the group consisting of an alkylene diol, a polyalkylene ether diol and mixtures thereof.

17. The polyisocyanurate foam of claim 16 wherein the organic polyisocyanate is a polymethylene polyphenylisocyanate, the polyester polyol is an aromatic polyester polyol having an average equivalent weight of from about 75 to 500, and the blowing agent is a halohydrocarbon.

18. The polyisocyanurate foam of claim 18 wherein the alkali metal salt of the low molecular weight carboxylic acid is potassium acetate, the alkali metal salt of the higher molecular weight carboxylic acid is potassium octoate, and the tertiary amine is 2,4,6-tris(dimethylaminomethyl) phenol.

19. The polyisocyanurate foam of claim 18 wherein the aromatic polyester polyol has an equivalent weight of from about 120 to 250 and an average funtionality of about 2 to 2.5.

20. A process for producing a laminate of a rigid polyisocyanurate foam comprising:
(a) contacting at least one continuously advancing facing sheet with a polyisocyanurate foam-forming mixture comprising an organic polyisocyanate, a minor amount of a polyester polyol, a blowing agent and, in an organic solvent, a catalyst mixture comprising (i) a salt of a low molecular weight carboxylic acid selected from the group consisting of an alkali metal salt and an alkaline earth metal salt and mixtures thereof, (ii) a salt of a higher molecular weight carboxylic acid selected from the group consisting of an alkali metal salt and an alkaline earth metal salt and mixtures thereof, and the higher molecular weight carboxylic acid having from about 5 to 30 carbon atoms, and (iii) a tertiary amine, and
(b) foaming the foam-forming mixture.

21. The process of claim 20 wherein the organic polyisocyanate is a polymethylene polyphenylisocyanate, the polyester polyol is an aromatic polyester polyol having an average equivalent weight of from about 75 to 500, the blowing agent is a halohydrocarbon, and the catalyst mixture comprises at least one alkali metal salt of the low molecular weight carboxylic acid, at least one alkali metal salt of the higher molecular weight carboxylic acid, the higher molecular weight carboxylic acid having from about 8 to 30 carbon atoms, and at least one tertiary amine in a polyol selected from the group consisting of an alkylene diol, a polyalkylene ether diol and mixtures thereof.

22. The process of claim 21 wherein the foam is cured at a temperature from about 125° F. to 250° F.

23. A laminate comprising at least one facing sheet adhered to a rigid polyisocyuanurate foam comprising the reaction product of an organic polyisocyanate, a minor amount of a polyester polyol, a blowing agent, and, in an organic solvent, a catalyst mixture comprising:
(a) a salt of a low molecular weight carboxylic acid selected from the group consisting of an alkali metal salt and an alkaline earth metal salt and mixtures thereof,
(b) a salt of a higher molecular weight carboxylic acid selected from the group consisting of an alkali metal salt and an alkaline earth metal salt and mixtures thereof, the higher molecular weight carboxylic acid having from about 5 to 30 carbon atoms, and
(c) a tertiary amine.

24. The laminate of claim 23 wherein the organic polyisocyanate is a polymethylene polyphenylisocyanate, the polyester polyol is an aromatic polyester polyol having an average equivalent weight from about 75 to 500, the blowing agent is a halohydrocarbon, and the catalyst mixture comprises at least one alkali metal salt of the low molecular weigth carboxylic acid, at least one alkali metal salt of the higher mol,ecular weight carboxylic acid, the higher moecular weight carboxylic acid having from about 8 to 30 carbon atoms, and at least one teriary maine in a polyol selected from the group consisting of an alkylene diol, a polyalkylene ether diol and mixtures thereof.

25. A catalyst mixture comprising (i) a salt of a low molcular weight carboyxlic acid selected from the group consisting of an alkali metal salt and an alkaline earth metal salt and mixtures thereof, (ii) a salt of a higher molecular weight carboxylic acid selected from the group consisting of an al;kali metal salt and an alkaline eath metal salt and mixtures thereof, the higher molecular weight carboxylic acid having from about 5 to 30 carbon atoms, and (iii) a tertiary amine.

26. The catalyst mixture of claim 25 which comprises at least one alkali metal salt of the low molecular weight carboxylic acid, at least one alkali metal salt of the higher molecular weight carboxylic acid, and at least one tertiary amine in a polyol selected from the group consisting of an alkylene diol, a polyalkylene ether diol and mixtures thereof.

27. The catalyst mixture of claim 26 wherein the equivalent ratio of low molecular weight carboxylate salt: higher molecular weight carboxylate salt is from about 0.5:1 to 5:1, and the equivalent ratio of carboxylate salts:tertiary amine is from about 1.5:1 to 5:1.

28. The catalyst mixture of claim 26 wherein the higher molecular weight carboxylic acid has from about 8 to 30 carbon atoms.

29. The catalyst mixture of claim 26 wherein the alkali metal salt of the low molecular weight carboxylic acid is potassium acetate, the alkali metal salt of the higher molecular weight carboxylic acid is potassium octoate, and the tertiary amine is 2,4,6-tris(dimethylaminomethyl) phenol.

30. The catalyst mixture of claim 29 wherein the equivalent ratio of potassium acetate:potassium octoate is from about 1.5:1 to 1.5:1, and the equivalent ratio of carboxylate salts:2,4,6-tris(dimethylaminomethyl) phenol is from about 2.5:1 to 3.5:1.

* * * * *